(12) United States Patent
Takeda et al.

(10) Patent No.: US 9,036,592 B2
(45) Date of Patent: May 19, 2015

(54) USER TERMINAL, RADIO BASE STATION APPARATUS AND RADIO COMMUNICATION METHOD

(75) Inventors: Kazuaki Takeda, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 135 days.

(21) Appl. No.: 13/983,219

(22) PCT Filed: Jan. 19, 2012

(86) PCT No.: PCT/JP2012/051045
§ 371 (c)(1),
(2), (4) Date: Aug. 1, 2013

(87) PCT Pub. No.: WO2012/108244
PCT Pub. Date: Aug. 16, 2012

(65) Prior Publication Data
US 2013/0308593 A1    Nov. 21, 2013

(30) Foreign Application Priority Data
Feb. 7, 2011   (JP) .................................. 2011-024393

(51) Int. Cl.
*H04W 72/04*    (2009.01)
*H04L 1/16*    (2006.01)
(Continued)

(52) U.S. Cl.
CPC ........... *H04W 72/042* (2013.01); *H04L 1/0073* (2013.01); *H04L 1/1692* (2013.01); *H04L 1/1861* (2013.01)

(58) Field of Classification Search
CPC . H04W 72/042; H04L 1/1861; H04L 1/1692; H04L 1/0073
See application file for complete search history.

(56) References Cited

U.S. PATENT DOCUMENTS

2007/0217362 A1* 9/2007 Kashima et al. ............... 370/330
2010/0120448 A1* 5/2010 Iwamura et al. ........... 455/456.1
(Continued)

OTHER PUBLICATIONS

Notification of Reasons for Rejection in corresponding Japanese Application No. 2011-024393 dated Dec. 10, 2013 (with translation)(5 pages).
(Continued)

*Primary Examiner* — Brian D Nguyen
(74) *Attorney, Agent, or Firm* — Osha Liang LLP

(57) ABSTRACT

The present invention adequately controls feedback control information in uplink transmission in a system band formed with a plurality of CCs. The present invention provides a data information demodulation section, which demodulates downlink shared channel signals of CCs from a radio base station apparatus, a retransmission check section, which checks retransmission and outputs a retransmission acknowledgement signal in response to the downlink shared channel signal of each of the plurality of CCs, a control information demodulation section, which demodulates downlink control information and detects the number of transport blocks, and a channel selection control section, which, with reference to a mapping table in which combinations of retransmission acknowledgement signals for the downlink shared channel signals of the plurality of CCs are defined using a plurality of radio resources and phase modulation bit information, determines radio resources to use to transmit the retransmission acknowledgement signals from a radio resource of an uplink control channel of a specific CC, and changes the content of the mapping table according to the number of transport blocks of the specific fundamental frequency block.

17 Claims, 15 Drawing Sheets

(51) Int. Cl.
*H04L 1/18* (2006.01)
*H04L 1/00* (2006.01)

(56) References Cited

U.S. PATENT DOCUMENTS

2010/0195611 A1* 8/2010 Allen et al. .................. 370/329
2010/0211840 A1* 8/2010 Kim et al. .................... 714/748
2010/0309808 A1* 12/2010 Miki et al. ................... 370/252
2010/0323709 A1* 12/2010 Nam et al. ................... 455/450
2011/0103506 A1* 5/2011 Moon et al. .................. 375/267

OTHER PUBLICATIONS

3GPP TSG RAN WG1 Meeting #62bis, "Mapping Tables for Format 1b with Channel Selection", Xi'an, China, Oct. 11-15, 2010 (7 pages).

International Search Report in corresponding International Application No. PCT/JP2012/051045 mailed Mar. 13, 2012 (3 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Nokia Siemens Networks, Nokia; "On Mapping Table for Channel Selection"; 3GPP TSG RAN WG1 Meeting #63, R1-106401; Jacksonville, USA; Nov. 15-19, 2010 (3 pages).

Notification of Reasons for Rejection in corresponding Japanese application No. 2011-024393 dated Apr. 30, 2013 (4 pages).

* cited by examiner

FORMAT 1a
(W/O SPATIAL MULTIPLEXING)

|     | CH1 |
| --- | --- |
| DTX | 0   |
| N   | 1   |
| A   | −1  |

A : ACK
N : NACK

FIG. 3A

FORMAT 1b
(W/ SPATIAL MULTIPLEXING)

|      | CH1 |
| ---  | --- |
| DTX  | 0   |
| N, N | 1   |
| N, A | −j  |
| A, N | j   |
| A, A | −1  |

A : ACK
N : NACK

FIG. 3B

MAPPING TABLE FOR 3A/N BITS

| ACK(0) | ACK(1) | ACK(2) | Ch1 | Ch2 | Ch3 |
|---|---|---|---|---|---|
| A | A | A |  | -1 |  |
| A | N/D | A |  | j |  |
| N/D | A | A |  | -j |  |
| N/D | N/D | A |  |  | -1 |
| A | A | N/D | -1 |  |  |
| A | N/D | N/D | j |  |  |
| N/D | A | N/D | -j |  |  |
| N/D | N/D | N |  |  | 1 |
| N | N/D | D | 1 |  |  |
| N/D | N | D | 1 |  |  |
| D | D | D | 0 | 0 | 0 |

A : ACK
N : NACK
D : DTX
N/D : NACK or DTX

FIG. 4A

MAPPING TABLE FOR 4A/N BITS

| ACK(0) | ACK(1) | ACK(2) | ACK(3) | Ch1 | Ch2 | Ch3 | Ch4 |
|---|---|---|---|---|---|---|---|
| A | A | A | A |  | -1 |  |  |
| A | N/D | A | A |  |  | -j |  |
| N/D | A | A | A |  | -j |  |  |
| N/D | N/D | A | A |  |  |  | -1 |
| A | A | A | N/D |  | j |  |  |
| A | N/D | A | N/D |  |  | 1 |  |
| N/D | A | A | N/D |  | 1 |  |  |
| N/D | N/D | A | N/D |  |  |  | j |
| A | A | N/D | A |  |  | -1 |  |
| A | N/D | N/D | A |  |  | j |  |
| N/D | A | N/D | A |  |  |  | -j |
| N/D | N/D | N/D | A |  |  |  | 1 |
| A | A | N/D | N/D | -1 |  |  |  |
| A | N/D | N/D | N/D | j |  |  |  |
| N/D | A | N/D | N/D | -j |  |  |  |
| N/D | N | N/D | N/D | 1 |  |  |  |
| N | N/D | N/D | N/D | 1 |  |  |  |
| D | D | N/D | N/D | 0 | 0 | 0 | 0 |

FIG. 4B

|  PCELL  |  | SCELL | IMPLICIT RESOURCE DERIVED FROM CCE INDEX OF PDCCH ON PCELL | | EXPLICIT RESOURCE INDICATED BY ARI |
|---|---|---|---|---|---|
| ACK(0) | ACK(1) | ACK(2) | Ch1 | Ch2 | Ch3 |
| A | A | A |  | −1 |  |
| A | N/D | A |  | j |  |
| N/D | A | A |  | −j |  |
| N/D | N/D | A |  |  | −1 |
| A | A | N/D | −1 |  |  |
| A | N/D | N/D | j |  |  |
| N/D | A | N/D | −j |  |  |
| N/D | N/D | N |  |  | 1 |
| N | N/D | D | 1 |  |  |
| N/D | N | D | 1 |  |  |
| D | D | D | 0 | 0 | 0 |

FIG. 5

|  | PCELL | | SCELL | | | |
| --- | --- | --- | --- | --- | --- | --- |
|  | ACK(0) | ACK(1) | ACK(2) | CH1 | CH2 | CH3 |
| A, A → | A | A | A |  | −1 |  |
|  | A | N/D | A |  | j |  |
|  | N/D | A | A |  | −j |  |
| N/D, A → | N/D | N/D | A |  |  | −1 |
| A, N/D → | A | A | N/D | −1 |  |  |
|  | A | N/D | N/D | j |  |  |
|  | N/D | A | N/D | −j |  |  |
| N/D, N → | N/D | N/D | N |  |  | 1 |
| N, D → | N | N/D | D | 1 |  |  |
|  | N/D | N | D | 1 |  |  |
| D, D → | D | D | D | 0 | 0 | 0 |

FIG. 6

1 CW ON PCELL AND 1 CWS ON SCELL

BEFORE CHANGE

| ACK (0) | ACK (1) | ACK (2) | Ch1 | Ch2 | Ch3 |
|---|---|---|---|---|---|
| A | A | A | | -1 | |
| A | N/D | A | | j | |
| N/D | A | A | | -j | |
| N/D | N/D | A | -1 | | |
| A | A | N/D | j | | |
| A | N/D | N/D | -j | | |
| N/D | A | N/D | 1 | | 1 |
| N/D | N/D | N | 1 | | |
| N | N/D | D | 0 | | |
| N/D | N | D | | 0 | |
| D | D | D | | | 0 |

FIG. 7A

AFTER CHANGE

| ACK (0) | ACK (1) | ACK (2) | Ch1 | Ch2 | Ch3 |
|---|---|---|---|---|---|
| A | A | A | | | j |
| A | N/D | A | | j | |
| N/D | A | A | | -j | |
| N/D | N/D | A | -1 | | -1 |
| A | A | N/D | j | | |
| A | N/D | N/D | -j | | |
| N/D | A | N/D | 1 | | 1 |
| N/D | N/D | N | 1 | | |
| N | N/D | D | 0 | | |
| N/D | N | D | | 0 | |
| D | D | D | | | 0 |

2 CWS ON PCELL AND 1 CW ON SCELL

| ACK(0) | ACK(1) | ACK(2) | ACK(3) | Ch1 | Ch2 | Ch3 | Ch4 |
|---|---|---|---|---|---|---|---|
| A | A | A | A | | | | |
| A | N/D | A | A | | | | -1 |
| N/D | A | A | A | | | -j | |
| N/D | N/D | A | A | | -1 | | |
|   |   |   |   |   |   |   |   |
| A | A | A | N/D | | -j | | |
| A | N/D | A | N/D | | j | | |
| N/D | A | A | N/D | | | 1 | |
| N/D | N/D | A | N/D | | 1 | | |
|   |   |   |   |   |   |   |   |
| A | A | N/D | A | | | -1 | |
| A | N/D | N/D | A | | | j | |
| N/D | A | N/D | A | | | | -j |
| N/D | N/D | N/D | A | | | | 1 |
|   |   |   |   |   |   |   |   |
| A | A | N/D | N/D | -1 | | | |
| A | N/D | N/D | N/D | j | | | |
| N/D | A | N/D | N/D | -j | | | |
| N/D | N/D | N/D | N/D | 1 | | | |
| N | N/D | N/D | N/D | 0 | 0 | 0 | 0 |
| D | N/D | N/D | N/D | 0 | 0 | 0 | 0 |

USER TERMINAL, RADIO BASE STATION APPARATUS AND RADIO COMMUNICATION METHOD

TECHNICAL FIELD

The present invention relates to a user terminal, a radio base station apparatus and a radio communication method in a next generation mobile communication system.

BACKGROUND ART

In a UMTS (Universal Mobile Telecommunications System) network, for the purposes of improving spectral efficiency and improving the data rates, system features which are based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing spectral efficiency and the peak data rate, reducing delay and so on, long-term evolution (LTE) has been under study (non-patent literature 1).

Unlike W-CDMA, LTE uses, as multiplexing schemes, OFDMA (Orthogonal Frequency Division Multiple Access) on the downlink, and SC-FDMA (Single Carrier Frequency Division Multiple Access) on the uplink.

As shown in FIG. 1, a signal to be transmitted on the uplink is mapped to adequate radio resources and transmitted from user terminals (UE (User Equipment) #1 and #2), to a radio base station apparatus. In this case, user data is allocated to an uplink shared channel (PUSCH: Physical Uplink Shared Channel). Also, when control information is transmitted at the same time with user data, the control information is multiplexed with the PUSCH, and, when control information alone is transmitted, the control information is allocated to an uplink control channel (PUCCH: Physical Uplink Control Channel).

Control information to be transmitted on the uplink includes downlink quality information (CQI: Channel Quality Indicator), retransmission acknowledgement signals (ACK/NACK) in response to downlink shared channel (PD-SCH: Physical Downlink Shared Channel)) signals and so on.

In the third-generation system (W-CDMA), it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Also, in the UMTS network, the successor system of LTE (referred to as, for example, "LTE-Advanced" or "LTE enhancement" (hereinafter referred to as "LTE-A")) is under study, for the purposes of further improving spectral efficiency and the peak data rate.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

In the LTE-A system, allocation of a wider frequency band than in LTE is under study for the purpose of further improving spectral efficiency and peak throughput. Also, in the LTE-A system (for example, Rel. 10), having backward compatibility with the LTE system is one requirement. Therefore, in the LTE-A system, a system band to have a plurality of fundamental frequency blocks (component carriers (CCs)) (carrier aggregation), each having a bandwidth which can be used in the LTE system, is studied to be employed.

In this case, feedback control information in response to data channels transmitted by a plurality of downlink CCs simply increases to a multiple of the number of CCs. Also, in the LTE-A system, the MIMO (Multiple Input Multiple Output) technology to use more transmitting/receiving antennas than the LTE system, and so on, are under study, and therefore increased feedback control information is anticipated.

In particular, in the uplink of the LTE-A system, application of SC-FDMA as a radio access scheme is under study. Consequently, also as for feedback control information (CQI, ACK/NACK and so on) in response to PDCCH signals transmitted by a plurality of downlink CCs, transmitting selectively from a single CC, in order to maintain the characteristics of uplink single-carrier transmission, is under study. In this case, in uplink transmission, feedback control information of a large number of bits is transmitted from a single CC, so that it is necessary to control transmission of feedback control information adequately.

The present invention has been made in view of the above, and it is therefore an object of the present invention to provide a user terminal, a radio base station apparatus and a radio communication method which can adequately control feedback control information in uplink transmission, in a system band that is formed with a plurality of fundamental frequency blocks.

Solution to Problem

A user terminal according to the present invention has a data information demodulation section configured to demodulate downlink shared channel signals of a plurality of fundamental frequency blocks from a radio base station apparatus, a retransmission check section configured to check retransmission and outputs a retransmission acknowledgement signal in response to the downlink shared channel signal of each of the plurality of fundamental frequency blocks, a control information demodulation section configured to demodulate downlink control information from the radio base station apparatus and detects the number of transport blocks, and a channel selection control section configured to, with reference to a mapping table in which combinations of retransmission acknowledgement signals for the downlink shared channel signals of the plurality of fundamental frequency blocks are defined using a plurality of radio resources and phase modulation bit information, determine radio resources to use to transmit the retransmission acknowledgement signals from a radio resource of an uplink control channel of a specific fundamental frequency block, and, in this user terminal, the channel selection control section changes content of the mapping table according to the number of transport blocks of the specific fundamental frequency block.

According to this configuration, by applying rank adaptation, even when the number of transports (the number of codewords) of a specific fundamental frequency block decreases, it is possible to select an adequate mapping table, and control feedback control information in uplink transmission adequately.

A radio base station apparatus according to the present invention has a data information generating section configured to generate a downlink shared channel signal for each of a plurality of fundamental frequency blocks, a transport block count determining section configured to determine the number of transport blocks to apply to transmission with a user terminal, and a channel selection data detection section configured to, with reference to a mapping table in which combinations of retransmission acknowledgement signals for the downlink shared channel signals of the plurality of fundamental frequency blocks are defined using a plurality of radio resources and phase modulation bit information, detect a retransmission acknowledgement signal reported from the user terminal, and, in this radio base station apparatus, the channel selection data detection section specifies content of the mapping table based on the number of transport blocks determined in the transport block count determining section.

A radio communication method according to the present invention includes, in a user terminal, the steps of demodulating downlink shared channel signals of a plurality of fundamental frequency blocks from a radio base station apparatus, acknowledging retransmission and outputting a retransmission acknowledgement signal in response to the downlink shared channel signal of each of the plurality of fundamental frequency blocks, demodulating downlink control information from the radio base station apparatus and detecting the number of transport blocks; and with reference to a mapping table in which combinations of retransmission acknowledgement signals for the downlink shared channel signals of the plurality of fundamental frequency blocks are defined using a plurality of radio resources and phase modulation bit information, determining radio resources to use to transmit the retransmission acknowledgement signals from a radio resource of an uplink control channel of a specific fundamental frequency block, and, in this radio communication method, the user terminal changes and applies content of the mapping table according to the number of transport blocks of the specific fundamental frequency block.

Technical Advantageous of Invention

According to the present invention, it is possible to adequately transmit feedback control information in uplink transmission.

BRIEF DESCRIPTION OF DRAWINGS

FIG. 3 provides diagrams each showing a mapping table of retransmission acknowledgement signal defined in Format 1a/1b of LTE (Rel. 8);

FIG. 4 provides diagrams each showing an example of a mapping table to apply to transmission of retransmission acknowledgement signals;

FIG. 5 is a diagram showing an example of a mapping table to apply to transmission of retransmission acknowledgement signals;

FIG. 6 is a diagram showing an example of a mapping table to apply to transmission of retransmission acknowledgement signals upon rank adaptation;

FIG. 7 provides diagrams each showing an example of a mapping table to apply to transmission of retransmission acknowledgement signals, according to the present embodiment;

FIG. 8 provides diagrams each showing an example of a mapping table to apply to transmission of retransmission acknowledgement signals, according to the present embodiment;

FIG. 9 provides diagrams each showing an example of a mapping table to apply to transmission of retransmission acknowledgement signals, according to the present embodiment;

Figures 10A, 10B:
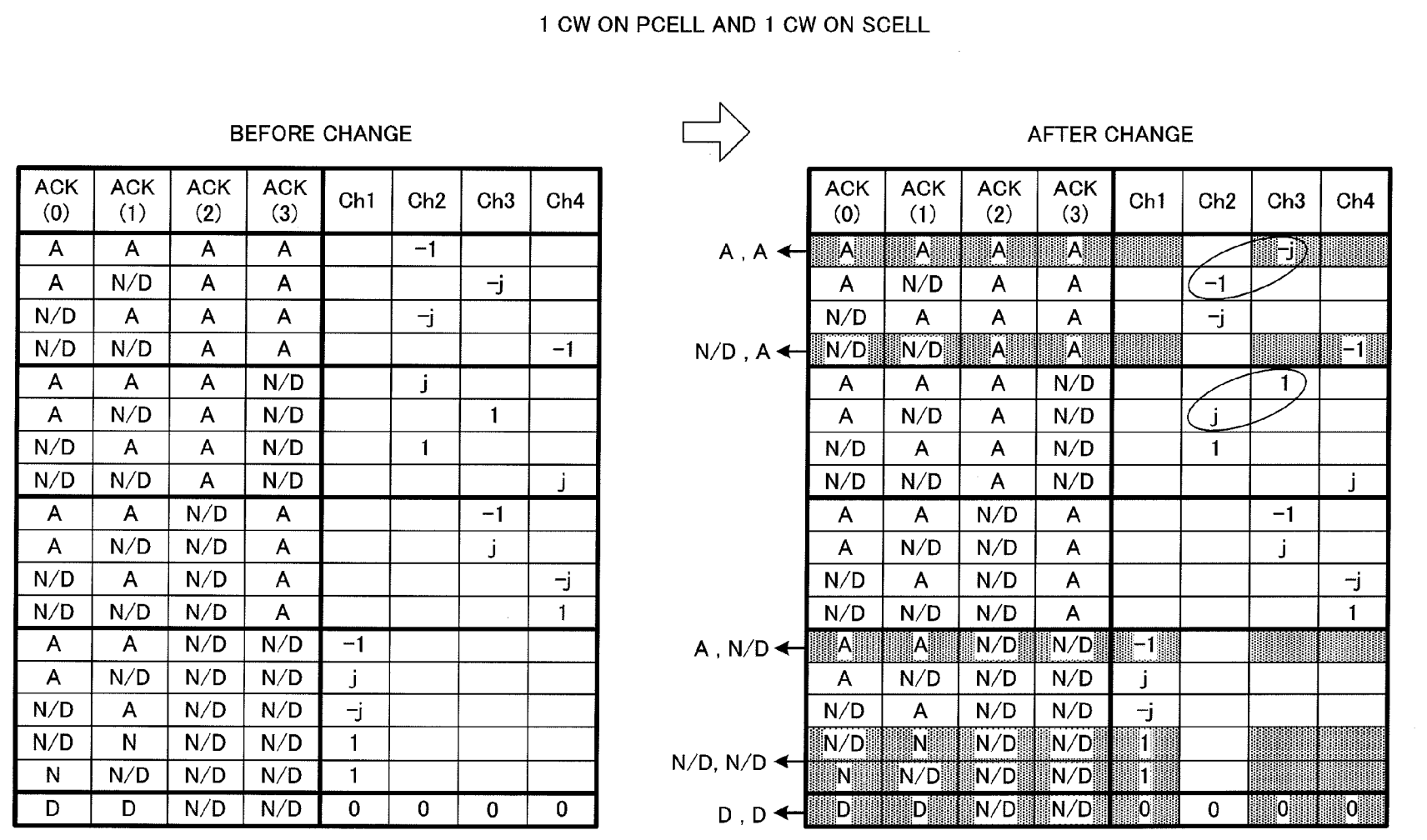

FIG. 10 provides diagrams each showing an example of a mapping table to apply to transmission of retransmission acknowledgement signals, according to the present embodiment;

FIG. 11 is a diagram showing an example of a mapping table to apply to transmission of retransmission acknowledgement signals, according to the present embodiment;

FIG. 12 is a diagram showing an example of a mapping table to apply to transmission of retransmission acknowledgement signals, according to the present embodiment;

FIG. 13 is a diagram showing an example of a mapping table to apply to transmission of retransmission acknowledgement signals, according to the present embodiment;

DESCRIPTION OF EMBODIMENTS

As described above, in response to a downlink shared channel (PDSCH) signal of a downlink CC, a retransmission acknowledgement signal (ACK/NACK), which is feedback control information, is transmitted by an uplink control channel (PUCCH). A retransmission acknowledgement signal is represented by either a positive acknowledgment (ACK), which indicates that a transmission signal has been received properly, or a negative acknowledgment (NACK), which indicates that a transmission signal has not been received properly.

The radio base station apparatus detects successful transmission of a PDSCH signal from an ACK and detects that an error has been detected in PDSCH signal from NACK. Also, a radio base station apparatus is able to determine that there is DTX (Discontinuous Transmission), when the received power in the radio resource allocated to a retransmission acknowledgement signal on the uplink is equal to or lower than a predetermined value.

DTX refers to a detection result to indicate that "neither ACK nor NACK has been reported from a user terminal," and this means that the user terminal has been unable to receive a downlink control channel (PDCCH) signal. In this case, the user terminal does not detect the PDSCH signal transmitted to that user terminal, and, as a result, does not transmit ACK or NACK. Although a radio base station apparatus transmits the next new data upon receiving ACK, in the event of NACK or in the DTX state without response, the radio base station apparatus carries out retransmission control to retransmit data that has been transmitted.

Figure 1:
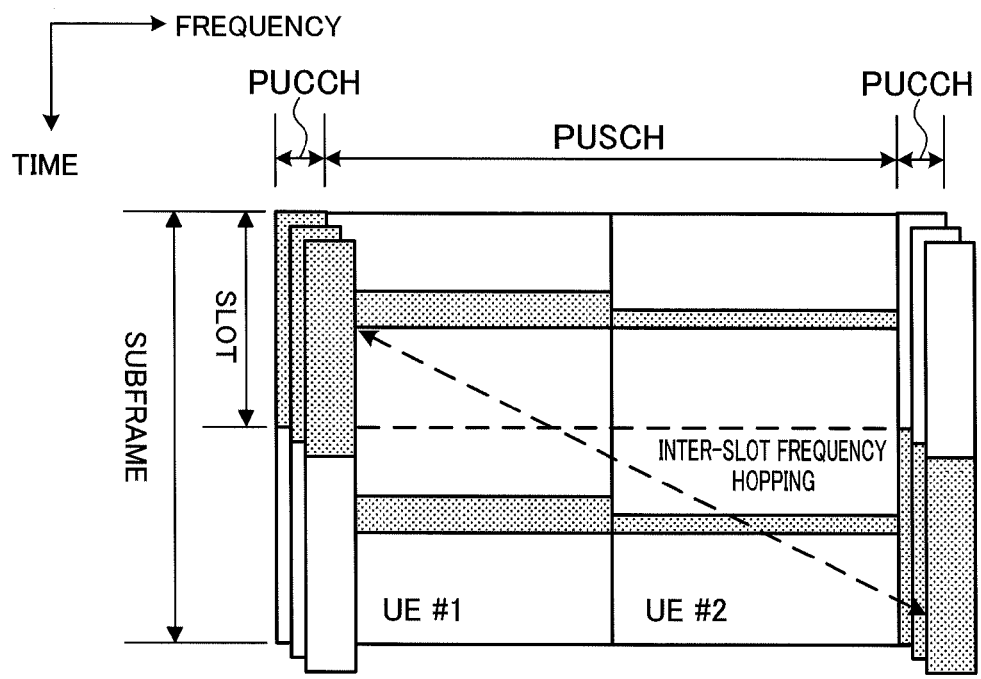
FIG. 1 is a diagram for explaining a channel structure where an uplink signal is mapped.
Figure 2:
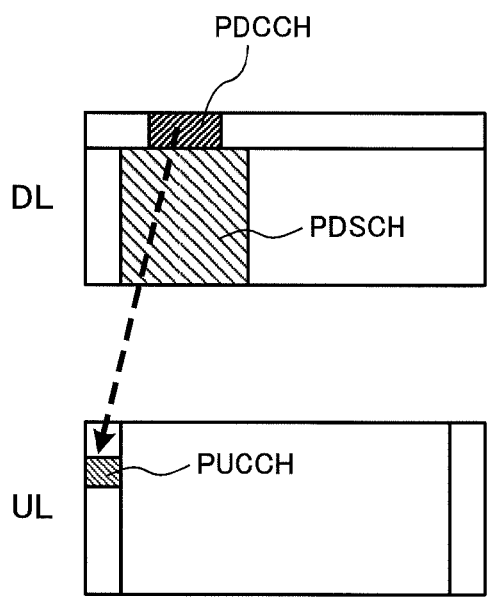
FIG. 2 is a schematic diagram for explaining radio resource for retransmission acknowledgement signal in the LTE (Rel. 8) system.

The user terminal is able to find radio resources of an uplink control channel (PUCCH) to use to transmit feedback control information, from parameters that are set by RRC signaling from a higher layer and the control channel element (CCE) indices (CCE indices) of the PDCCH (see FIG. 2). For example, for radio resources of the PUCCH, OCC (Orthogonal Cover Code), CS (Cyclic Shift) and RB (Resource Block) indices are used. Feedback control information is multiplexed on predetermined radio resource of the PUCCH determined in this way, and transmitted to the radio base station apparatus.

Now, in LTE (Rel. 8), as shown in FIG. 3, reporting formats for ACK/NACK (formats 1a/1b) in response to downlink shared channel (PDSCH) signals are defined.

In the event of one-codeword ("1CW") transmission (the number of transport blocks is one ("1TB")), three states are defined, namely "ACK," "NACK" and "DTX" (see FIG. 3A), and, in the event of two-codeword ("2CW") transmission (the number of transport blocks is two ("2TB")), five states are defined, namely "ACK, ACK," "ACK, NACK," "NACK, ACK," "NACK, NACK" and "DTX" (see FIG. 3B). Note that, in the following descriptions, "ACK" will also be referred to as "A," "NACK" will also be referred to as "N," and "DTX" will also be referred to as "D."

A codeword (CW) represents the coding unit in channel coding (error correction coding), and, when MIMO multiplex transmission is adopted, one codeword or a plurality of codewords are transmitted. In LTE, single-user MIMO uses maximum two codewords. In the event of two-layer transmission, each layer serves as an individual codeword, and, in the event of four-layer transmission, every two layers serve as one codeword.

Also, in the mapping tables of FIG. 3, "0" indicates that the user terminal does not transmit information to the radio base station apparatus in the subject subframe, and "1," "−1," "j" and "−j" each indicate a specific phase state. For example, in FIG. 3A, "1" and "−1" correspond to "0" and "1," respectively, and can represent one bit of information. Also, in FIG. 3B, "1," "−1," "j" and "−j" correspond to "00," "11," "10" and "01," respectively, and can represent two bits of information. Consequently, with formats 1a/1b, it is possible to transmit up to maximum two bits.

On the other hand, in the LTE-A system, in order to maintain the characteristics of uplink single carrier transmission, transmitting a retransmission acknowledgement signal in response to PDSCH signals transmitted by a plurality of downlink CCs by the PUCCH of a specific CC, is under study. Then, in the LTE-A system, a mapping table, in which a plurality of radio resources are applied to formats 1a/1b, and combinations of retransmission acknowledgement signals of a plurality of CCs are defined by bit information by phase modulation (for example, QPSK data modulation) and radio resource selection information, is under study (channel selection).

Note that the specific CC that is used to transmit a retransmission acknowledgement signal in response to PDSCH signals transmitted by a plurality of downlink CCs is referred to as "PCC" (Primary Component Carrier), and the CC besides the PCC is referred to as "SCC" (Secondly Component Carrier). Also, the serving cell in the PCC is also referred to as "PCell" (Primary Cell), and the serving cell in the "SCC" is also referred to as "SCell" (Secondly Cell).

Presently, in the FDD scheme of the LTE-A system, adopting channel selection up to two CCs is under study. FIG. 4 shows an example of a mapping table in the event channel selection is applied in a system band formed with two fundamental frequency blocks (PCC and SCC). The mapping table is determined by the number of CCs and transmission mode allocated by RRC signaling from a higher layer (that is to say, the number of transport blocks or the number of codewords).

FIG. 4A shows a case where three radio resources (Ch1 to Ch3) are applied to format 1b (where one of the PCC and the SCC is 1CW and the other one is 2CW). FIG. 4B shows a case where four radio resources (Ch1 to Ch4) are applied to format 1b (where the PCC and the SCC are 2CW). In FIG. 4A, ACK (0) and ACK (1) correspond to the retransmission acknowledgement signals for the PCC (2CW), and ACK (2) corresponds to the retransmission acknowledgement signal for the SCC (1 CW). Alternatively, ACK (0) corresponds to the retransmission acknowledgement signal for the PCC (1CW), and the ACK (1) and ACK (2) correspond to the retransmission acknowledgement signals for the SCC (2CW). Also, in FIG. 4B, ACK (0) and ACK (1) correspond to the retransmission acknowledgement signals for the PCC (2CW), and ACK (2) and ACK (3) correspond to the retransmission acknowledgement signal for the SCC (2CW).

As radio resources (for example, Ch1 to Ch4) in the mapping table, it is possible to use OCC (Orthogonal Cover Code), CS (Cyclic Shift) and RB (Resource Block) indices, as in the above-described LTE system.

The user terminal checks retransmission with respect to the downlink shared channel signal of each a plurality of CCs, and determines the radio resource of the PUCCH to use to transmit retransmission acknowledgement signals based on the combination of the retransmission acknowledgement signal of each CC to feed back to the radio base station apparatus and the mapping table shown in FIG. 4. For example, when the PCC and the SCC are 2CW, "NACK, ACK" is fed back as a retransmission acknowledgement signal in response to the PUSCH signal of the PCC and "ACK, ACK" is fed back as a retransmission acknowledgement signal in response to the PUSCH signal of the SCC, j" of the QPSK modulation symbol in the radio resource (Ch2) is used (see FIG. 4B).

Also, in channel selection, it is possible to make a plurality of radio resources (for example, Ch1 to Ch4) of the PUCCH designated in the mapping table be radio resources of the PCC to be designated using the downlink control channel (PDCCH) of each CC (here, the PCC and SCC).

For example, in the mapping table (in which the PCC and the SCC are 2CW) shown in FIG. 4B, as described above, the radio resources (for example, Ch1 and Ch2) can designate the radio resources designated using the CCE index of the downlink shared channel of the PCC.

Also, in the mapping table (in which the PCC and the SCC are 2CW) shown in FIG. 4B, the radio resources (for example, Ch3 and Ch4) can designate the radio resources designated in the ARI (ACK/NACK Resource Indicator) field provided in the downlink control channel of the SCC.

Here, the ARI refers to identification information for designating the radio resource to use for the retransmission acknowledgement signals. To be more specific, a plurality of (for example, four) radio resources are allocated to each user terminal by RRC signaling from a higher layer, and, from the plurality of radio resources, the radio resources that are designated in the ARI field is dynamically designated. The ARI field is replaced by the TPC command field (two bits) in the PDCCH of the SCC, and, from the plurality of radio resources allocated by RRC signaling, the radio resources which the user terminal uses are designated. Then, from the plurality of radio resources allocated by RRC signaling, the user terminal is able to determine the radio resource for the retransmission acknowledgement signals by specifying the radio resources designated in the ARI field.

As described above, by applying channel selection, even when the retransmission acknowledgement signals in response to the PDSCHs of a plurality of CCs are transmitted by the PUCCH of the CC of the unit value, it is possible to adequately set and transmit the retransmission acknowledgement signals for a plurality of CCs.

On the other hand, when MIMO multiplexing transmission is applied, a control scheme (rank adaptation) to change the number of transmission streams (rank) depending on the state of reception is adopted. In this rank adaptation, the radio base station executes control such that, based on downlink channel information (received SINR, fading correlation between antennas, etc.), information is transmitted in space multiplexing transmission mode to a user terminal of a good channel state, while, to a user terminal of a poor channel state, information is transmitted in transmission diversity mode.

For example, when the mapping table (in which the PCC is 2CW and the SCC is 1CW) shown in FIG. 5 is provided, the user terminal determines the radio resource of the PUCCH to use to transmit the retransmission acknowledgement signal with reference to that mapping table.

However, when the number of codewords (the number of transports) of the PCC decreases down to 1CW due to application of rank adaptation, how to transmit retransmission acknowledgement signals is the problem.

For example, it is possible to apply a mapping table in which "ACK, ACK" and "NACK, NACK" for the PCC are seen as and changed to "ACK" and "NACK," respectively (see FIG. 6). However, in this case, even though the number of retransmission acknowledgement signal bits of the PCC and SCC of 1CW-transmission is small (2A/N bits), the retransmission acknowledgement signals are transmitted by designating three radio resources. Note that, in the mapping table of FIG. 6, the parts to be used after the change are the hatching parts, and "A, A," "N/D, A," "A, N/D," "N, D" and "D, D" outside the mapping table represent the combinations of retransmission acknowledgement signals for the PCC (1CW) and the SCC (1CW).

Also, the present inventor has found out that, when semi-persistent scheduling (SPS) is adopted and the codewords of the PCC decrease due to application of rank adaptation, how to apply a mapping table posts a problem. According to the SPS defined in LTE (Rel. 8), four radio resources are allocated to each user terminal by higher layer signals, one radio resource to use to transmit a retransmission acknowledgement signal is allocated using the TPC command field of two bits in the DCI format. On the other hand, in LTE-A (Rel. 10), there is an agreement to selectively transmit from the PCC upon SPS transmission.

When a mapping table in which the PCC is 2CW is used, two radio resources (for example, Ch1 and Ch2) are required to transmit retransmission acknowledgement signals. However, in this case, when SPS transmission takes place, only one radio resource to use to transmit the retransmission acknowledgement signal can be designated (for example, Ch1).

Consequently, for example, when the mapping table shown in FIG. 5 is provided (in which the PCC is 2CW and the SCC is 1CW), designation of radio resources (Ch1 and Ch2) when the PCC decreases down to 1CW, due to application of rank adaptation, or SPS transmission, posts a problem. For example, although it is possible to designate one radio resource (for example, Ch1 in FIG. 5) between two radio resources (Ch1 and Ch2 of FIG. 5) using the PDCCH to use for SPS transmission, how to determine the other radio resource (Ch2 in FIG. 5) is the problem.

The present inventor has found out that, when the number of codewords (the number of transports) of each CC changes due to change in the communication environment such as rank adaptation and/or the like, transmission of retransmission acknowledgement signals using a mapping table posts a problem, and arrived at the idea of performing channel selection by selecting an adequate mapping table according to the number of transports.

Now, a method of selecting an adequate mapping table according to the number of transports will be described below in detail with reference to the accompanying drawings. Note that although an example of LTE-A will be described with the present embodiment, the present invention is by no means limited to LTE-A. The present invention may be applied to any communication system as long as the communication system controls transmission of feedback control information using carrier aggregation, which provides a wide band by gathering a plurality of fundamental frequency block into one.

Also, although a case will be described in the following descriptions where the number of downlink CCs is two (the PCC and the SCC), this is by no means limiting, and the present invention is applicable even when the number of downlink CCs is two or greater. Also, the number of radio resources to set in the mapping table for channel selection is also one example, and the number to be described below is by no means limiting. Also, in the following descriptions, an example will be shown where, when the number of transport blocks of the PCC and the SCC decreases due to application of rank adaptation, the mapping table is changed and used, the following mapping table is equally applicable to cases where the retransmission acknowledgement signals for the PCC is made one in SPS.

The user terminal which will be shown with the present embodiment performs radio communication in a system band formed with a plurality of fundamental frequency blocks (for example, the PCC and the SCC). The user terminal has a data information demodulation section, which demodulates the downlink shared channel signals of the PCC and the SCC, a retransmission check section, which checks retransmission with respect to the downlink shared channel signal of each of the PCC and the SCC and outputs a retransmission acknowledgement signal, a control information demodulation section, which demodulates downlink control information and detects the number of transport blocks (the number of codewords), and a channel selection control section, which determines the radio resources to use to transmit the retransmission acknowledgement signals from the radio resources of the uplink control channel of the PCC, with reference to a mapping table.

The mapping table which the user terminal uses defines the combinations of retransmission acknowledgement signals in response to the downlink shared channel signals of the PCC and the SCC using a plurality of radio resources and bit information of phase modulation. The user terminal changes the content of the mapping table as appropriate according to the number of transport blocks reported dynamically from the base station apparatus, and applies the mapping table. By this means, even when the number of codewords of the PCC decreases due to application of rank adaptation, it is possible to select an adequate mapping table and perform channel selection.

The content of the mapping table can be changed by selecting predetermined parts from the mapping table according to the number of transport blocks. For example, when the number of transport blocks of the PCC decreases due to application of rank adaptation, a mapping table, the content of which is predetermined parts selected from the content of the mapping table before the decrease of the number of transport blocks, is applied. In this case, depending on whether or not rank adaptation is applied, instead of changing the mapping table itself, the content is changed by selecting predetermined parts from a specific mapping table.

For example, it is possible to change the content of the mapping table such that the number of radio resources to set in the mapping table decreases when the number of transport blocks of the fundamental frequency blocks of the PCC decreases. Also, as for the combination of retransmission acknowledgement signal for the PCC (2CW), it is possible to select predetermined parts by making the combination of "ACK, ACK" be "ACK" and the combination of "NACK, NACK" be "NACK."

Note that, when the mapping table which the user terminal uses is also provided in the radio base station apparatus, so that, it is possible to specify the content of the mapping table according to the number of transport blocks reported to the user terminal.

As described above, for the radio resources (for example, Ch1 to Ch4) of the mapping table, the radio resources for the uplink control channel of the PCC, designated using the downlink shared channel of the PCC and the SCC, are designated.

Next, an example of the mapping table to apply to the present embodiment will be described.

FIG. 7A shows a mapping table, in which three radio resources are applied to format 1b, assuming usage in the event the PCC is 2CW-transmission and the SCC is 1CW-transmission. On the other hand, in FIG. 7B, taking into account the case where the number of codewords of the PCC decreases due to rank adaptation, a mapping table according to the present embodiment, which has a characteristic of being able to reduce the number of radio resources to use, is shown. According to the present embodiment, as a mapping table determined from the number of CCs and transmission mode reported by RRC signaling from a higher layer, the mapping table of FIG. 7B is used, instead of the mapping table of FIG. 7A.

In the mapping table (FIG. 7B) after the change, the parts to use upon rank adaptation are the hatching parts, and, when rank adaptation is applied, predetermined parts (here, the hatching parts) of the mapping table are selected and applied. That is to say, when rank adaptation is not applied, the entire content of the mapping table of FIG. 7B (the white-frame parts and the hatching parts) is applied, and, when rank adaptation is applied, predetermined parts of the mapping table of FIG. 7B are selected, and a mapping table with changed content is applied. In this case, depending on whether or not rank adaptation is applied, instead of changing the mapping table itself, the content is changed by selecting predetermined parts of a mapping table. Note that "A, A," "N/D, A," "A, N/D," "N, D" and "D, D" outside the mapping table represent combinations of the PCC (1CW) and the SCC (1CW) when rank adaptation is applied.

On the other hand, a configuration may be provided which uses the mapping table of FIG. 7A when the PCC is 2CW-transmission and the SCC is 1CW-transmission, and which uses the mapping table of FIG. 7B, instead of the mapping table of FIG. 7A, when the number of codewords of the PCC decreases due to rank adaptation. In this case, depending on whether or not rank adaptation is applied and so on, the mapping table is changed.

In FIG. 7B, as the mapping table (the hatching parts) when rank adaptation is applied, the combination of "ACK, ACK" in the PCC (2CW) is made "ACK" and the combination of "NACK, NACK" ("N/D, N/D") is made "NACK" ("N/D"). That is to say, in the mapping table of FIG. 7B when rank adaptation is applied, the parts of "A, N/D" and "N/D, A" in the PCC (2CW) are not selected.

By changing the mapping table in this way, in the mapping table of FIG. 7B, when the SCC (1CW) while rank adaptation is not applied is "DTX" and the retransmission acknowledgement signal for the PCC becomes equivalent to format 1a, even when rank adaptation is applied, it is possible to support format 1a when the SCC (1CW) is "DTX." By providing a configuration in which the PCC supports format 1a when the SCC is DTX, it is possible to use a common mapping table for the PCC regardless of whether or not carrier aggregation is applied, so that it is possible to prevent instantaneous failure of communication during the process of switching between applying and not applying carrier aggregation.

Also, assume that, when rank adaptation is applied to the mapping table of FIG. 7B, one radio resource (here, Ch2) is reduced, and the radio resources to be designated in the mapping table are made two. In this case, with the mapping table of FIG. 7B, the combinations of retransmission acknowledgment signals for the PCC (1CW) and the SCC (1CW) are defined using two radio resources (Ch1 and Ch3). Also, in FIG. 7B, the combination of "ACK, ACK" of the PCC (1CW) and the SCC (1CW) is defined as "j" in Ch3. By this means, even when a radio resource (Ch2) is reduced (not selected) depending on whether or not rank adaptation is applied, it is possible to represent the combination of "ACK, ACK" of the PCC (1CW) and the SCC (1CW). In this way, by reducing the number of radio resources to designate in the mapping table when rank adaptation is applied, it is possible to reduce the number of radio resources to use to transmit retransmission acknowledgement signals, when the number of information bits of retransmission acknowledgement signals for the PCC (1CW) and the SCC (1CW) is small.

Regardless of the number of codewords, the user terminal uses the mapping table (after the change) of FIG. 7B, instead of the mapping table of FIG. 7A. In this case, when rank adaptation is applied, predetermined parts in the mapping table of FIG. 7B are selected, and a mapping table with changed content is applied. Besides, a configuration to use the mapping table (before the change) of FIG. 7A when rank adaptation is not applied and use the mapping table (after change) of FIG. 7B when rank adaptation is applied, may be employed. By this means, even when the number of codewords of the PCC decreases due to application of rank adaptation, it is possible to set the number of radio resources in channel selection adequately, and also support format 1a when the SCC is DTX.

Figure 8A:
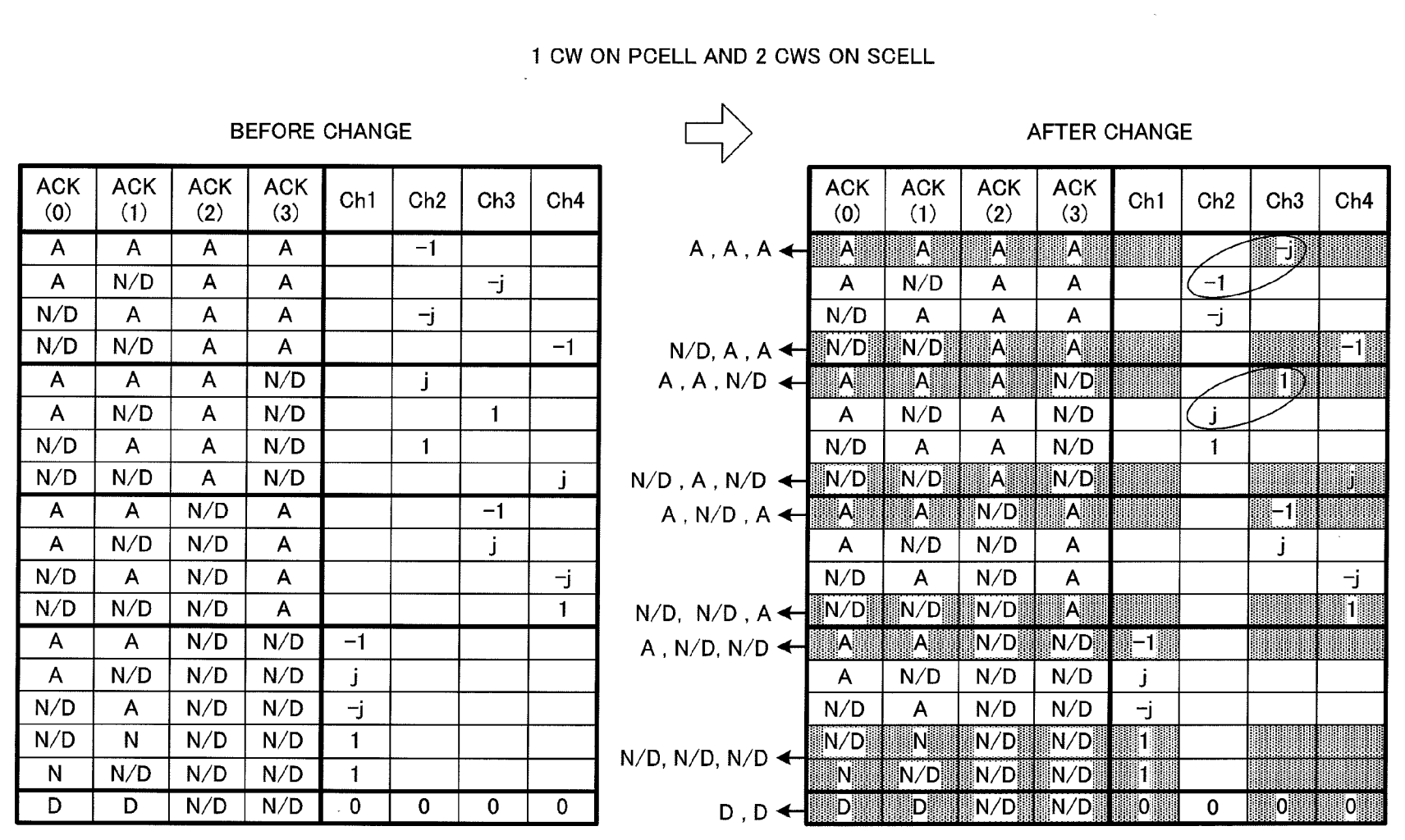

FIG. 8A shows a mapping table, in which four radio resources are applied to format 1b, assuming usage in the event the PCC is 2CW-transmission and the SCC is 2CW-transmission. On the other hand, in FIG. 8B, taking into account the case where the number of codewords of the PCC decreases due to rank adaptation, a mapping table according to the present embodiment, which has a characteristic of being able to reduce the number of radio resources to use, is shown. With the present embodiment, the mapping table of FIG. 8B is used, instead of the mapping table of FIG. 8A, as a mapping table that is determined by the number of CCs and transmission mode reported by RRC signaling from a higher layer.

Note that, in the mapping table (FIG. 8B) after the change, when rank adaptation is applied, predetermined parts (the hatching parts) of the mapping table are selected and applied. That is to say, when rank adaptation is not applied, the entire content of the mapping table of FIG. 8B is applied, and, when rank adaptation is applied, predetermined parts in the mapping table of FIG. 8B are selected, and a mapping table with changed content is applied. In this case, depending on whether or not rank adaptation is applied, instead of changing the mapping table itself, the content is changed by selecting predetermined parts of a mapping table. Note that "A, A, A," "N/D, A, A," "A, A, N/D," "N/D, A, N/D," "A, N/D, A," "N/D, N/D, A," "A, N/D, N/D" and "N/D, N/D, N/D" outside the mapping table represent the combinations of the PCC (1CW) and the SCC (2CW) when rank adaptation is applied. These will be represented in the same way in the following descriptions of mapping tables.

On the other hand, a configuration may be provided which uses the mapping table of FIG. 8A when the PCC is 2CW-transmission and the SCC is 2CW-transmission, and which uses the mapping table of FIG. 8B, instead of the mapping table of FIG. 8A, when the number of codewords of the PCC decreases due to rank adaptation. In this case, depending on whether or not rank adaptation is applied and so on, the mapping table is changed.

In FIG. 8B, as a mapping table (the hatching parts) when rank adaptation is applied, the combination of "ACK, ACK" in the PCC (2CW) is made "ACK" and the combination of "NACK, NACK" is made "NACK." That is to say, in the mapping table of FIG. 8B when rank adaptation is applied, the parts of "ACK, NACK/DTX" and "NACK/DTX, ACK" in the PCC (2CW) are not selected.

By changing the mapping table in this way, in the mapping table of FIG. 8B, when the SCC (2CW) while rank adaptation is not applied is "DTX" and the retransmission acknowledgement signal for the PCC becomes equivalent to format 1a, even when rank adaptation is applied, it is possible to support format 1a when the SCC (2CW) is "DTX."

Also, with the present embodiment, when rank adaptation is applied to the mapping table of FIG. 8B, compared to when rank adaptation is applied to the mapping table of FIG. 8A before the change, one radio resource (here, Ch2) is reduced and the number of radio resources to designate is made three. In this case, in the mapping table of FIG. 8B, the combinations of retransmission acknowledgement signals of the PCC (1CW) and the SCC (2CW) are defined using the three radio resources (Ch1, Ch3 and Ch4) of the mapping table of FIG. 8A. In this way, by reducing the radio resources to designate in the mapping table when rank adaptation is applied, it is possible to reduce the number of radio resources to use to transmit retransmission acknowledgement signals when the number of information bits of retransmission acknowledgement signal combination information of the PCC (1CW) and the SCC (2CW) decreases.

Also, in FIG. 8B, the combination of "A, A, A" for the PCC (1CW) and the SCC (2CW) is defined as "–j" in Ch3, and "A, A, N/D" is defined as "1" in Ch3. That is to say, in FIG. 8B, change is made such that the bit information defined by the combinations "A, A, A, A" and "A, N/D, A, A" of the PCC (2CW) and the SCC (2CW) in FIG. 8A is switched. Also, change is made such that the bit information defined by the combinations of "A, A, A, N/D" and "A, N/D, A, N/D" of the PCC (2CW) and the SCC (2CW) is switched.

The user terminal uses the mapping table (after the change) of FIG. 8B, instead of the mapping table of FIG. 8A, regardless of the number of codewords. In this case, when rank adaptation is applied, predetermined parts in the mapping table of FIG. 8B are selected, and a mapping table with changed content is applied. In this case, it is possible to use the mapping table of FIG. 8A (before the change) when rank adaptation is not applied, and use the mapping table of FIG. 8B (after the change) when rank adaptation is applied and the number of codewords of the PCC decreases from 2CW to 1CW. By this means, even when the number of codewords of the PCC decreases due to application of rank adaptation, it is possible to set the number of radio resources in channel selection adequately, and also support formats 1a/1b when the SCC is DTX.

Note that, although a case is shown in FIG. 8 where the PCC decreases from 2CW to 1CW-transmission, FIG. 9 shows the mapping table to apply when the SCC decreases from 2CW to 1CW-transmission due to rank adaptation (where the PCC is 2CW-transmission and the SCC is 1CW-transmission). Also, FIG. 10 shows the mapping table to apply when the PCC and the SCC decrease from 2CW to 1CW-transmission due to rank adaptation (where the PCC is 1CW-transmission and the SCC is 1CW-transmission). The user terminal is able to adequately change and apply predetermined parts (the hatching parts) selected in mapping tables of FIG. 8B to FIG. 10B according to the number of transport blocks reported by the PDCCH. That is to say, the user terminal selects different mapping table content depending on the number of transport blocks.

Figures 9A, 9B:
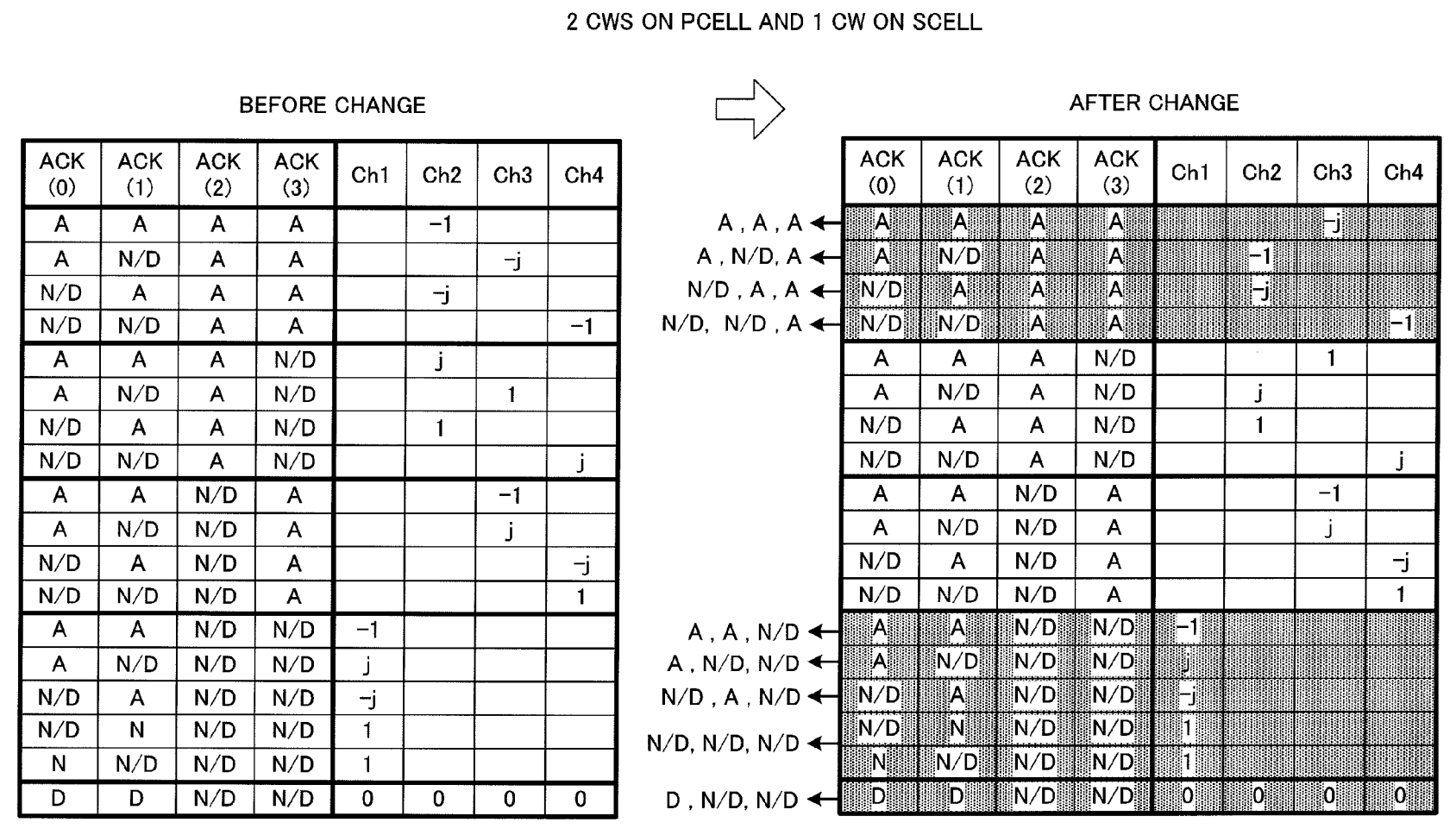

FIG. 9A shows a mapping table, in which four radio resources are applied to format 1b, assuming usage in the event the PCC is 2CW-transmission and the SCC is 2CW-transmission. Meanwhile, FIG. 9B shows a mapping table, which has a characteristic of being able to reduce the radio resources when the number of codewords of the PCC decreases due to rank adaptation, applied to the case where the number of codewords of the SCC decreases due to rank adaptation. With the present embodiment, the mapping table of FIG. 9B is used, instead of the mapping table of FIG. 9A, as a mapping table that is determined by the number of CCs and transmission mode reported by RRC signaling from a higher layer. On the other hand, a configuration may be provided which uses the mapping table of FIG. 9A when the PCC is 2CW-transmission and the SCC is 2CW-transmission, and which uses the mapping table of FIG. 9B, instead of the mapping table of FIG. 9A, when the number of codewords of the PCC decreases due to rank adaptation.

In the mapping table of FIG. 9B, the combination of "ACK, ACK" in the SCC (2CW) is made "ACK" and the combination of "NACK, NACK" is made "NACK." Also, in the mapping table of FIG. 9B, the parts of "A, N/D" and "N/D, A" in the SCC (2CW) are not selected.

By this means, while rank adaptation is applied to the mapping table of FIG. 9A, when the SCC (2CW) is "DTX" and the state of the retransmission acknowledgement signal for the PCC becomes equivalent to format 1b, even with the mapping table of FIG. 9B, it is possible to support format 1b when the SCC (1CW) is "DTX."

The user terminal uses the mapping table (after the change) of FIG. 8B, instead of the mapping table of FIG. 8A, regardless of the number of codewords. In this case, when rank adaptation is applied, predetermined parts in the mapping table of FIG. 9B are selected, and a mapping table with changed content is applied. In this case, it is possible to use the mapping table of FIG. 9A (before the change) when rank adaptation is not applied, and use the mapping table of FIG. 9B (after the change) when rank adaptation is applied and the number of codewords of the SCC decreases from 2CW to 1CW. By this means, even when the number of codewords of the SCC decreases due to application of rank adaptation, it is possible to set acknowledgment transmission content in channel selection adequately, and also support formats 1a/1b when the SCC is DTX.

FIG. 10A shows a mapping table, in which four radio resources are applied to format 1b, assuming usage in the event the PCC is 2CW-transmission and the SCC is 2CW-transmission. On the other hand, in FIG. 10B, taking into account the case where the number of codewords of the PCC and the SCC decreases due to rank adaptation, the mapping table according to the present embodiment (FIG. 10B), which has a characteristic of being able to reduce the number of radio resources to use for the PCC, is shown. With the present embodiment, the mapping table of FIG. 9B is used, instead of the mapping table of FIG. 9A, as a mapping table that is determined by the number of CCs and transmission mode reported by RRC signaling from a higher layer.

Note that, in the mapping table (FIG. 8B) after the change, when rank adaptation is applied, predetermined parts (the hatching parts) of the mapping table are selected and applied. That is to say, when rank adaptation is not applied, the entire content of the mapping table of FIG. 10B is applied, and, when rank adaptation is applied, predetermined parts in the mapping table of FIG. 10B are selected, and a mapping table with changed content is applied. In this case, depending on whether or not rank adaptation is applied, instead of changing the mapping table itself, the content is changed by selecting predetermined parts of a mapping table.

On the other hand, it is equally possible to provide a configuration to use the mapping table of FIG. 10A when the PCC is 2CW transmission and the SCC is 2CW transmission, and use the mapping table of FIG. 10B, instead of the mapping table of FIG. 10A, when the number of codewords of the PCC and the SCC decreases due to rank adaptation.

In FIG. 10B, in the mapping table (the hatching parts) when rank adaptation is applied, the combination of "ACK, ACK" in the PCC (2CW) and the SCC (2CW) is made "ACK" and the combination of "NACK, NACK" is made "NACK." Also, in the mapping table of FIG. 10B, the parts of "A, N/D" and "N/D, A" in the PCC (2CW) and the SCC (2CW) are not selected.

By changing the mapping table in this way, in the mapping table of FIG. 10B, when the SCC (1CW) while rank adaptation is not applied is "DTX" and the state of the retransmission acknowledgement signal for the PCC becomes equivalent to format 1a, even when rank adaptation is applied, it is possible to support format 1a when the SCC (1CW) is "DTX."

Also, with the present embodiment, when rank adaptation is applied to the mapping table of FIG. 10B, compared to when rank adaptation is applied to the mapping table of FIG. 10A before the change, one radio resource (here, Ch2) is reduced and the number of radio resources to designate is made three. In this case, in the mapping table of FIG. 10B, using three radio resource (Ch1, Ch3 and Ch4) of the mapping table of FIG. 10A, the combinations of retransmission acknowledgement signals of the PCC (1CW) and the SCC (2CW) are defined. In this way, by reducing the radio resources to designate in the mapping table when rank adaptation is applied, it is possible to reduce the number of radio resources to use to transmit retransmission acknowledgement signals, when the number of retransmission acknowledgement signal information bits of the PCC (1CW) and the SCC (2CW) decreases.

Also, in FIG. 10B, the combination of "A, A, A" for the PCC (1CW) and the SCC (2CW) is defined as "–j" in Ch3, and "A, A, N/D" is defined as "1" in Ch3. That is to say, in FIG. 10B, change is made such that the bit information defined by the combinations "A, A, A, A" and "A, N/D, A, A" of the PCC (2CW) and the SCC (2CW) in FIG. 10A is switched. Also, change is made such that the bit information defined by the combinations of "A, A, A, N/D" and "A, N/D, A, N/D" of the PCC (2CW) and the SCC (2CW) is switched.

Note that, when, in the mapping table of FIG. 10A before change, the combination of "ACK, ACK" in the PCC (2CW) and the SCC (2CW) is made "ACK" and the combination of "NACK, NACK" is made "NACK," bit information is not defined in Ch3, so that a configuration which does not use Ch3 may be used.

The user terminal uses the mapping table (after the change) of FIG. 10B, instead of the mapping table of FIG. 10A, regardless of the number of codewords. In this case, when rank adaptation is applied, predetermined parts in the mapping table of FIG. 10B are selected, and a mapping table with changed content is applied. Besides, it is also possible to use the mapping table of FIG. 10A (before the change) when rank adaptation is not applied, and use the mapping table of FIG. 10B (after the change) when rank adaptation is applied and the number of codewords of the PCC decreases from 2CW to 1CW. By this means, even when the number of codewords of the PCC decreases due to application of rank adaptation, it is possible to set the number of radio resources in channel selection adequately, and also support format 1a when the SCC is DTX.

Note that, although, with the above mapping tables shown in FIG. 7 to FIG. 10, in mapping tables after change, the combination of "ACK, ACK" in the PCC (2CW) is made "ACK" and/or the combination of "NACK, NACK" in the SCC (2CW) is made "NACK," the method of changing a mapping table is by no means limited to this. For example, the combination of "ACK, NACK" may be made "ACK."

Figure 11:
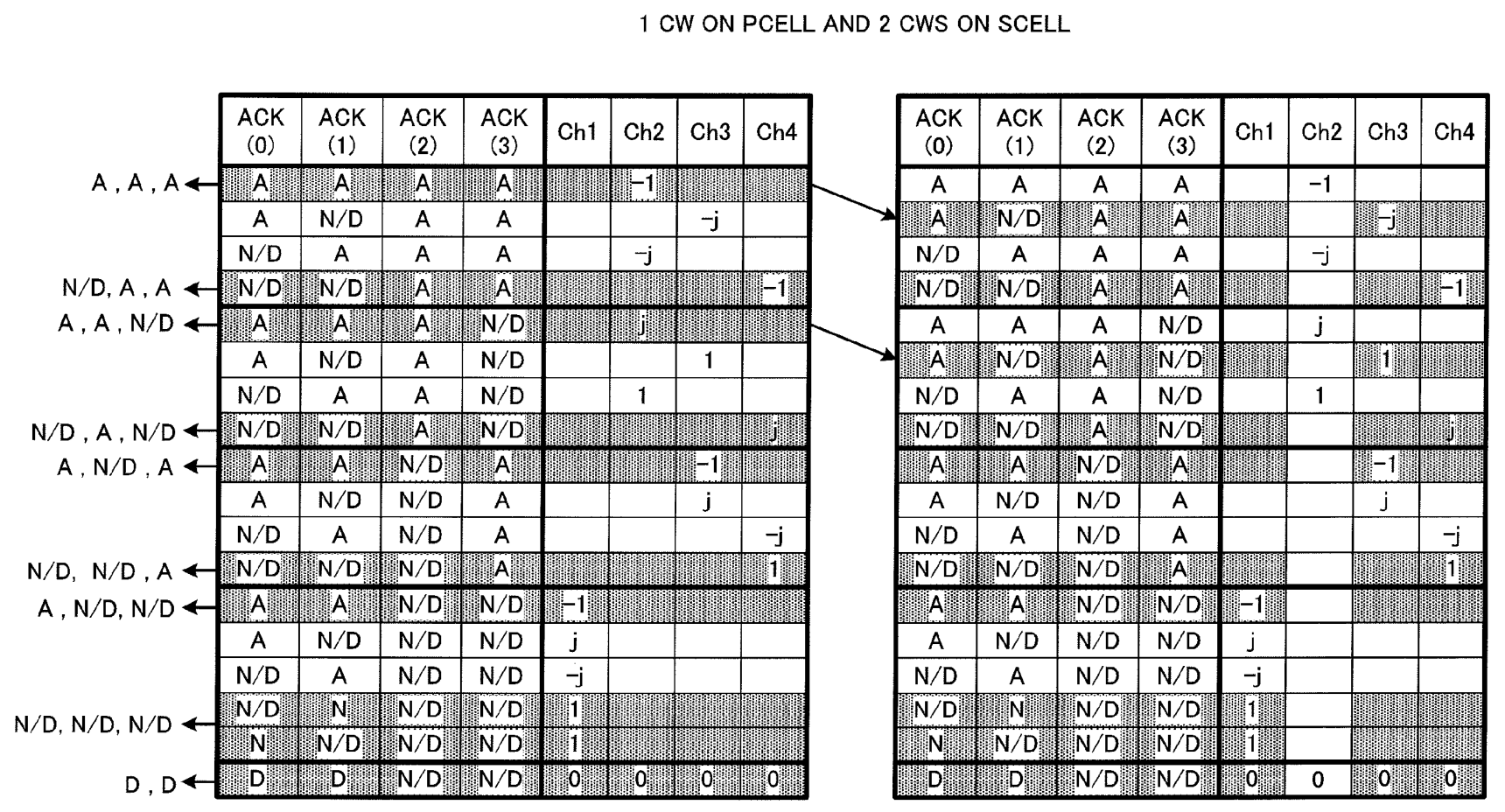
Figure 13:
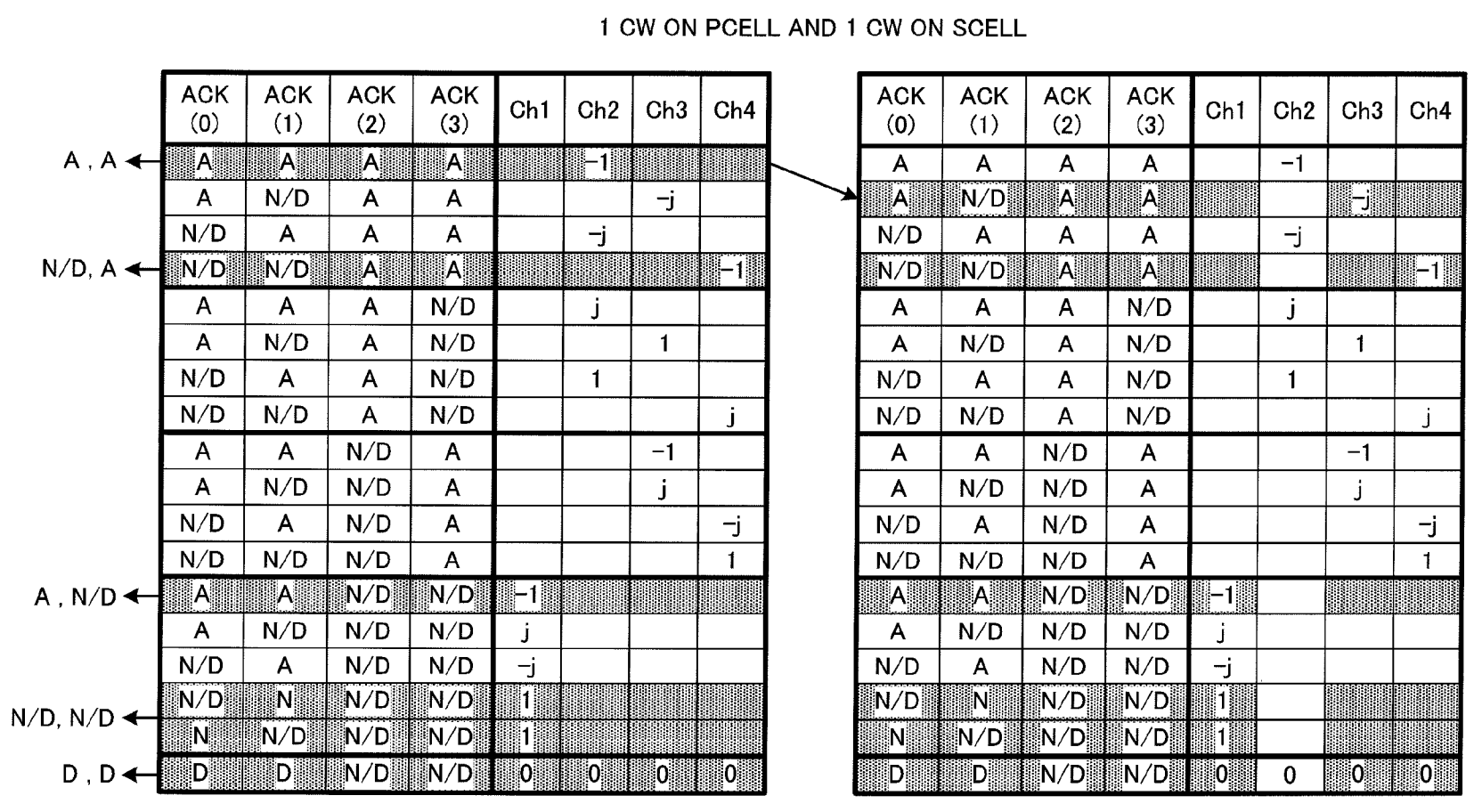

For example, in the mapping tables before change in FIG. 8 to FIG. 10, when rank adaptation is applied, mapping tables in which the combination of "ACK, NACK" in predetermined parts is made "ACK," so that it is possible to support formats 1a/1b and also reduce the number of radio resources of the PCC, are shown in FIG. 11 to FIG. 13.

In FIG. 11 to FIG. 13, when rank adaptation is applied, the user terminal selects and applies predetermined parts (the hatching parts) of the mapping table. That is to say, when rank adaptation is not applied, the entire content of the mapping tables is applied, and, when rank adaptation is applied, content which selects predetermined parts of the mapping tables is applied. The user terminal is able to adequately change and apply the predetermined parts (hatching parts) selected in the mapping tables of FIG. 11 to FIG. 13 according to the transmission mode. By applying the mapping tables shown in FIG. 11 to FIG. 13, even when the number of codewords of the PCC decreases due to application of rank adaptation, it is possible to set the acknowledgement retransmission content in channel selection adequately and also support formats 1a/1b when the SCC is DTX.

Note that the mapping tables shown in FIG. 7 to FIG. 13 are only examples, and the mapping tables that are applicable to the present invention are by no means limited to these. Also, although examples have been shown in the above descriptions where a mapping table is changed and used when the number of transport blocks of the PCC and the SCC decreases due to application of rank adaptation, the mapping tables shown with the present embodiment are equally applicable when the retransmission acknowledgement signals for the PCC in SPS are made one.

Now, the configurations of a user terminal and a radio base station apparatus adopting the radio communication method described with the above embodiment will be described. Here, a case will be described where a radio base station apparatus and user terminals to support a system of the LTE-A scheme (LTE-A system) are used.

Figure 14:
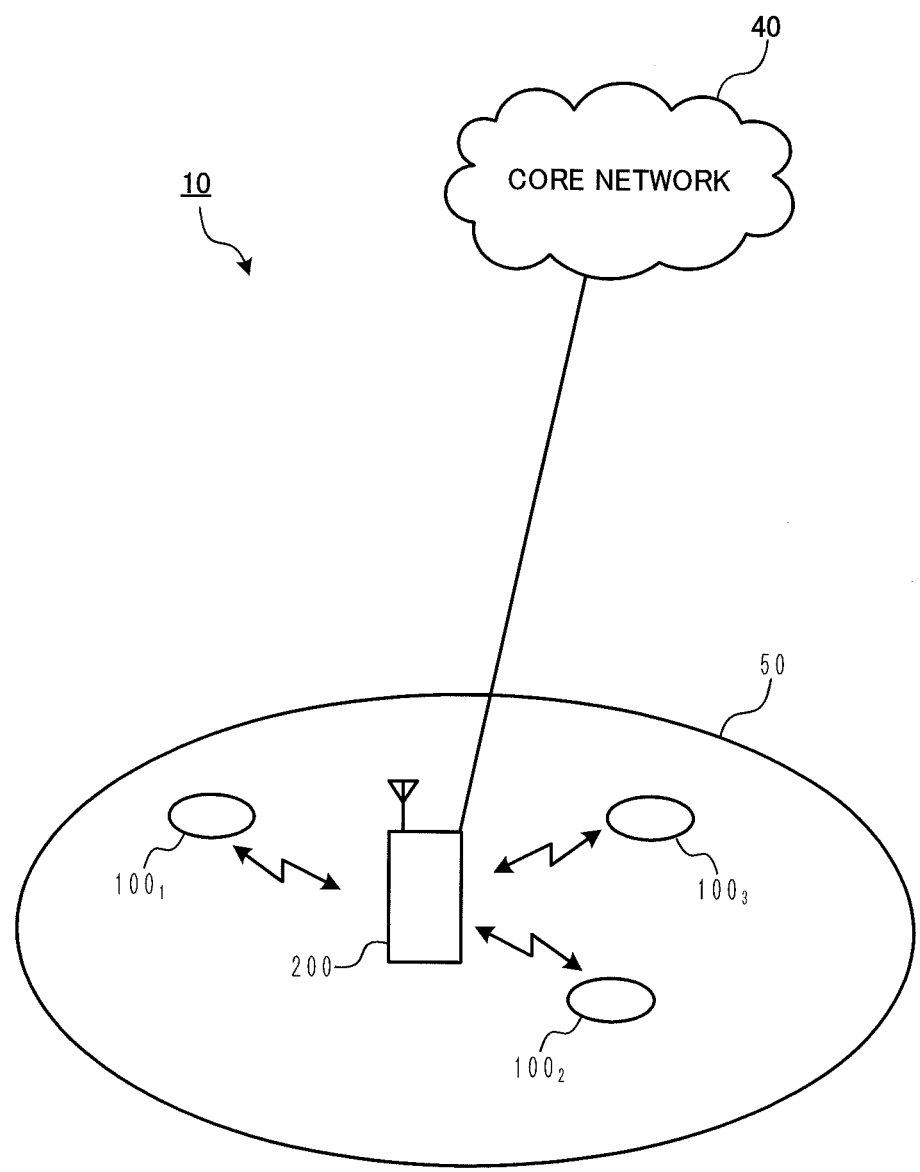
FIG. 14 is a diagram for explaining a configuration of a mobile communication system having a user terminal and a radio base station apparatus according to the present embodiment.

First, referring to FIG. 14, a mobile communication system 10 having a user terminal 100 and a radio base station apparatus 200 will be described. FIG. 14 is a diagram for explaining the configuration of the mobile communication system 10 having a user terminal 100 and a radio base station apparatus 200 according to an embodiment of the present invention. Note that the mobile communication system 10 shown in FIG. 14 is a system to accommodate, for example, the LTE system or SUPER 3G. This mobile communication system 10 may also be referred to as IMT-Advanced or may be referred to as 4G.

As shown in FIG. 14, the mobile communication system is configured to include a radio base station apparatus 200, and a plurality of user terminals 100 ($100_1$, $100_2$, $100_3$, ... $100_n$, where n is an integer to satisfy n>0) that communicate with the radio base station apparatus 200. The radio base station apparatus 200 is connected with a core network 40. The user terminals 100 communicate with the radio base station apparatus 200 in a cell 50. Note that the core network 40 includes, for example, an access gateway apparatus, a radio network controller (RNC), a mobility management entity (MME) and so on, but this is by no means limiting.

In the mobile communication system 10, as radio access schemes, OFDMA is applied to the downlink, and SC-FDMA is applied to the uplink.

OFDMA is a multi-carrier transmission scheme to perform communication by dividing a frequency band into a plurality of narrow frequency bands (subcarriers) and mapping data to each subcarrier. SC-FDMA is a single-carrier transmission scheme to perform communication by mapping data to a continuous band per terminal, and realizes multiple access by allowing a plurality of terminals to use mutually different bands.

Here, communication channels in the LTE system will be described. As for the downlink, the PDSCH, which transmits traffic data of each user terminal 100, the PDCCH, which reports RB allocation information in the PDSCH, data modulation scheme/channel coding rate, L1/L2 control information such as retransmission-related information, to each user terminal, and so on are used. Also, reference signals to be used in channel estimation, received quality measurement and so on are transmitted together with these channels.

On the uplink, the PUSCH, which transmits traffic data of each user terminal 100, the PUCCH, which transmits channel quality information (CQI) reports for downlink frequency scheduling, and L1/L2 control information such as ACK/NACK in response to downlink transmission data, and so on are used. Also, a demodulation reference signal to be used in channel estimation and a channel quality measurement reference signal to be used in channel quality measurement are transmitted together with these channels.

Next, with reference to FIG. 15, a functional configuration of a user terminal to transmit uplink control information using the above-described mapping tables will be described.

A case will be described in the following descriptions where, when uplink control information is transmitted on the uplink from a user terminal, a plurality of users are orthogonal-multiplexed using cyclic shifts of CAZAC code sequence, and retransmission acknowledgement signals, which are feedback control information, are transmitted. Note that a case will be shown in the following descriptions where retransmission acknowledgement signals in response to downlink shared channels received from two CCs are transmitted, the number of CCs is by no means limited to these.

Figure 15:
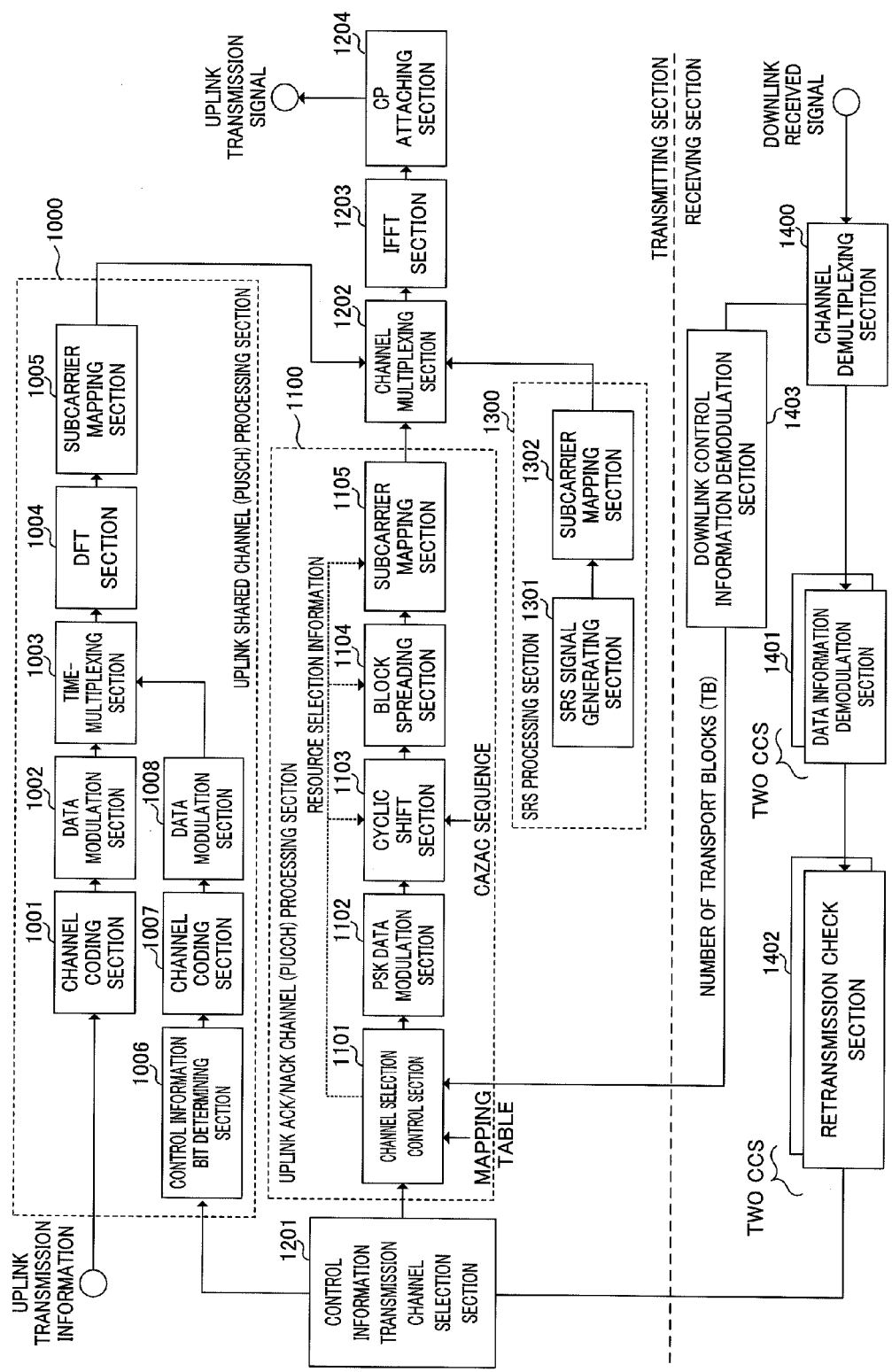
FIG. 15 is a diagram showing a schematic configuration of a user terminal according to an embodiment of the present invention.

The user terminal shown in FIG. 15 has a transmitting section and a receiving section. The receiving section has a channel demultiplexing section 1400, which demultiplexes a received signal into control information and the data signal, a data information demodulation section 1401, which demodulates an OFDM signal, a retransmission check section 1402, which checks retransmission with respect to the downlink shared channel signal for each of the PCC and the SCC and outputs the retransmission acknowledgment signals, and a downlink control information demodulation section 1403, which demodulates downlink control information. Meanwhile, the transmitting section has a control information transmission channel selection section 1201, an uplink shared channel (PUSCH) processing section 1000, an uplink ACK/NACK channel (PUCCH) processing section 1100, an SRS processing section 1300, a channel multiplexing section 1202, an IFFT section 1203, and a CP attaching section 1204.

The data information demodulation section 1401 receives and demodulates a downlink OFDM signal. That is to say, the CPs are removed from the downlink OFDM signal, and, by performing a fast Fourier transform, the subcarriers where the BCH signal or the downlink control signal is allocated are extracted, and the data is demodulated. When downlink OFDM signals are received from a plurality of CCs, data is demodulated on a per CC basis. The data information demodulation section 1401 outputs the downlink signal after the data demodulation to the retransmission check section 1402.

The retransmission check section 1402 determines whether or not the received downlink shared channel signal (PDSCH signal) has been received without error, and checks retransmission with each state ACK when the downlink shared channel signal has been received without error, NACK when error is detected, and DTX when the downlink shared channel signal is not detected—and outputs retransmission acknowledgment signals. When a plurality of CCs are allocated to communication with the radio base station apparatus, whether or not the downlink shared channel signal has been received without error is determined per CC. Also, the retransmission check section 1402 detects the above three states on a per codeword basis. Upon two-codeword transmission, the above three states are detected on a per codeword basis. The retransmission check section 1402 outputs the detection results to the transmitting section (here, the control information transmission channel selection section 1201).

The downlink control information demodulation section 1403 demodulates downlink control information from the radio base station apparatus and detects the number of transport blocks. When a plurality of CCs are allocated for communication with the radio base station apparatus, the downlink control information demodulation section 1403 detects the number of transport blocks set for each CC. The downlink control information demodulation section 1403 outputs the detection result to the channel selection control section 1101.

The control information transmission channel selection section 1201 selects the channel to transmit the retransmission acknowledgement signals, which are feedback control information. To be more specific, the control information transmission channel selection section 1201 determines whether to include and transmit retransmission acknowledgement signals in the uplink shared channel (PUSCH) or include and transmit retransmission acknowledgement signals in the uplink control channel (PUCCH). For example, in the subframe upon transmission, when there is a PUSCH signal, this is output to the uplink shared channel processing section 1000, and retransmission acknowledgement signals are mapped to the PUSCH and transmitted. On the other hand, when there is no PUSCH signal in the subframe, this is output to the uplink ACK/NACK channel (PUCCH) processing section 1100, and retransmission acknowledgement signals are transmitted using the radio resources of the PUCCH.

The uplink shared channel processing section 1000 has a control information bit determining section 1006, which determines the bits of the retransmission acknowledgement signals based on the detection result in the retransmission check section 1402, a channel coding section 1007, which performs error correction coding of the ACK/NACK bit sequence, a channel coding section 1001, which performs error correction coding of the data sequence to be transmitted, data modulation sections 1002 and 1008, which perform data modulation of the data signal after the coding, a time-multiplexing section 1003, which time-multiplexes the modulated data signal and a retransmission acknowledgement signal, a DFT section 1004, which performs DFT (Discrete Fourier Transform) on the time-multiplexed signal, and a subcarrier mapping section 1005, which maps the signal after the DFT to subcarriers.

The uplink ACK/NACK channel (PUCCH) processing section 1100 has a channel selection control section 1101 which controls the radio resources of the PUCCH to use to transmit retransmission acknowledgement signals, a PSK data modulation section 1102 which performs PSK data modulation, a cyclic shift section 1103 which applies a cyclic shift to the data modulated in the PSK data modulation section 1102, a block spreading section 1104 which performs block spreading of the signal after the cyclic shift using a block spreading code, and a subcarrier mapping section 1105 which maps the signal after the block spreading to subcarriers.

The channel selection control section 1101 determines the radio resources to use to transmit retransmission acknowledgement signals from the radio resources of the uplink control channel of the PCC with reference to the mapping table. The mapping table which the channel selection control section 1101 uses defines the combinations of retransmission acknowledgement signals in response to the downlink shared channel signals of the PCC and the SCC using a plurality of radio resources and bit information of phase modulation. The channel selection control section 1101 adequately changes and applies the content of the mapping table, depending on the number of transport blocks that is acquired by demodulating the downlink control information from the radio base station apparatus in the downlink control information demodulation section 1403. To be more specific, it is possible to apply content that is given by selecting predetermined parts of a mapping table depending on the number of transport block of the PCC and the SCC. For example, by applying the mapping tables shown in above FIG. 7 to FIG. 13, radio resources to use for retransmission acknowledgement signals are selected. The selection information is reported the PSK data modulation section 1102, the cyclic shift section 1103, the block spreading section 1104 and the subcarrier mapping section 1105.

For example, when the number of transport blocks of the PCC that is designated dynamically in the PDCCH is one, the channel selection control section 1101 applies a mapping table, the content of which is predetermined parts that are selected from the mapping table to be applied when the number of transport blocks of the PCC is two (for example, FIG. 7B, FIG. 8B, FIG. 10B). In this case, a mapping table, in which the number of radio resources is reduced by one from the mapping table to be applied when the number of transport blocks of PCC is two, is applied.

The PSK data modulation section 1102 performs phase modulation (PSK data modulation) based on information reported from the channel selection control section 1101. For example, in the PSK data modulation section 1102, modulation into bit information of two bits by QPSK data modulation is performed.

The cyclic shift section 1103 performs orthogonal multiplexing using the cyclic shift of a CAZAC (Constant Amplitude Zero Auto Correlation) code sequence. To be more specific, a time domain signal is shifted through a predetermined amount of cyclic shift. Note that the amount of cyclic shift varies per user, and is associated with cyclic shift indices. The cyclic shift section 1103 outputs the signal after the cyclic shift to the block spreading section 1104. The block spreading section (orthogonal code multiplication means) 1104 multiplies the reference signal after the cyclic shift by an orthogonal code (performs block spreading). Here, as for the OCC (block spreading code number) to use for the reference signal may be reported by RRC signaling and so on from a higher layer, or the OCC associated with the CS of the data symbol in advance may be used as well. The block spreading section 1104 outputs the signal after the block spreading to the subcarrier mapping section 1105.

The subcarrier mapping section 1105 maps the signal after the block spreading to subcarriers based on information that is reported from the channel selection control section 1101. Also, the subcarrier mapping section 1105 outputs the mapped signal to the channel multiplexing section 1202.

The SRS processing section 1300 has an SRS signal generating section 1301 which generates an SRS signal (Sounding RS), and a subcarrier mapping section 1302 which maps the generated SRS signal to subcarriers. The subcarrier mapping section 1302 outputs the mapped signal to the channel multiplexing section 1202.

The channel multiplexing section 1202 time-multiplexes the signal from the uplink shared channel processing section 1000 or the uplink ACK/NACK channel (PUCCH) processing section and the reference signal from the SRS signal processing section 1300, and makes a transmission signal including an uplink control channel signal.

The IFFT section 1203 performs an IFFT and converts the channel-multiplexed signal into a time domain signal. The IFFT section 1203 output the signal after the IFFT to the CP attaching section 1204. The CP attaching section 1204 attaches CPs to the signal after the orthogonal code multiplication. Then, an uplink transmission signal is transmitted to the radio communication apparatus using the uplink channel of the PCC.

Next, the functional configuration of a radio base station apparatus that performs radio communication with the user terminal shown in FIG. 15 will be described with reference to FIG. 16.

Figure 16:
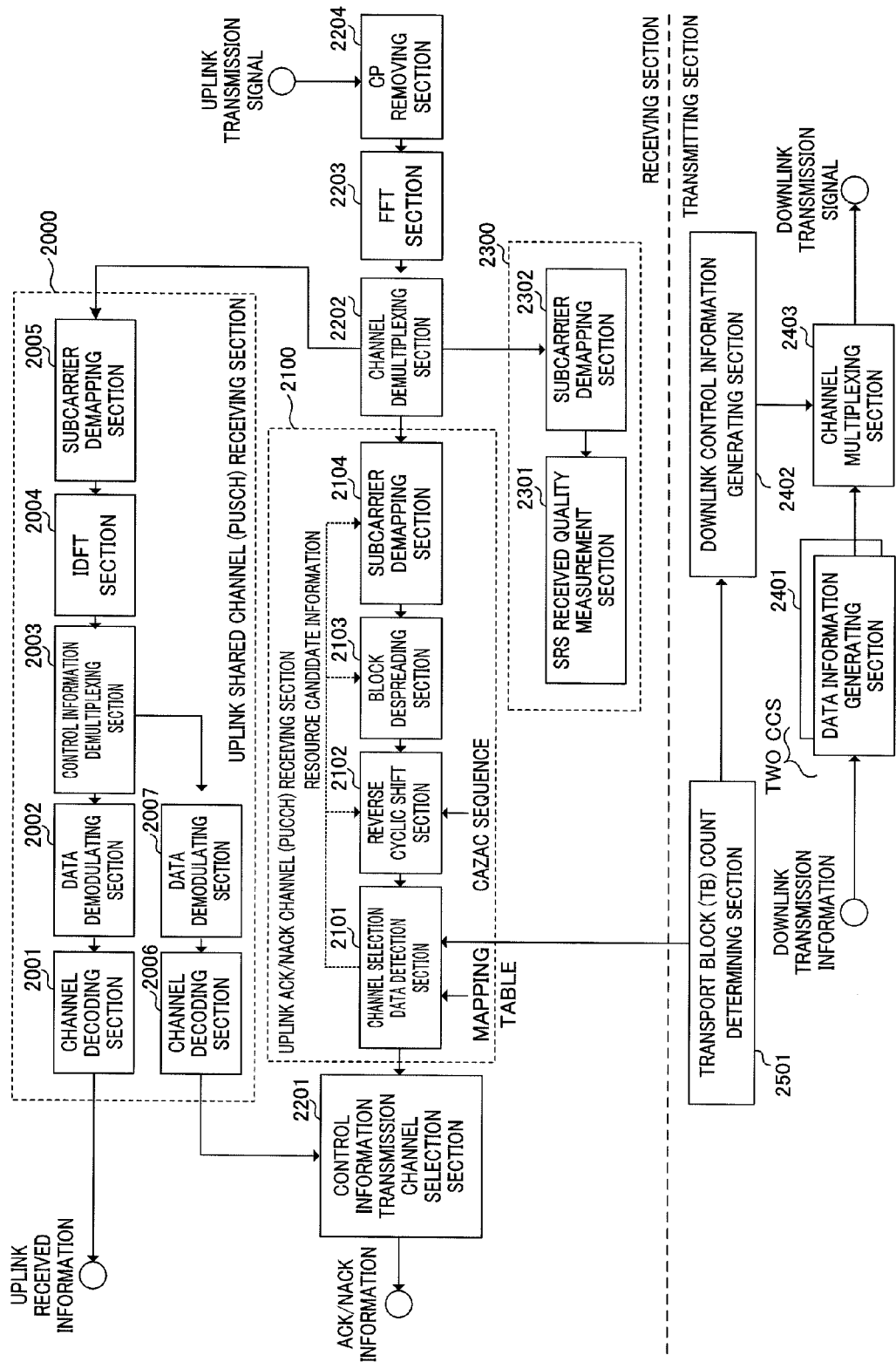
FIG. 16 is a diagram showing a schematic configuration of a radio base station apparatus according to an embodiment of the present invention.

The radio base station apparatus shown in FIG. 16 has a transmitting section and a receiving section. The transmitting section has a data information generating section 2401 which generates an OFDM signal for each of a plurality of CCs, a downlink control information generating section 2402 which generates downlink control information, a channel multiplexing section 2403 which multiplexes a data signal from the data information generating section 2401 and a control signal from the downlink control information generating section 2402 and makes a downlink transmission signal, and a transport block (TB) count determining section 2501 which determines the number of transport blocks to apply to transmission with the user terminal.

In the downlink control information generating section 2402, by including the number of transports determined in the radio base station apparatus in the downlink control channel, a downlink control channel signal is provided. Information related to the number of transports is output from the transport block (TB) count determining section 2501.

The transport block count determining section 2501 determines the number of transports to apply to transmission with the user terminal based on the rank indicators and received quality information of the user terminal, transmitted from the user terminal. The transport block count determining section 2501 outputs the determined information to the channel selection data detection section 2101 and the downlink control information generating section 2402.

The receiving section has a CP removing section 2204 which removes the CPs from a received signal, an FFT section 2203 which performs a fast Fourier transform (FFT) of the received signal, a demultiplexing section 2202 which demultiplexes the multiplexed signals (PUSCH signal, PUCCH signal, SRS signal), an uplink shared channel (PUSCH) receiving section 2000 which processes the signals after the channel demultiplexing, an uplink ACK/NACK channel (PUCCH) receiving section 2100, and an SRS signal receiving section 2300.

The uplink shared channel receiving section 2000 has a subcarrier demapping section 2005 which demaps a signal after the channel demultiplexing, an IDFT section 2004 which performs an IDFT (Inverse Discrete Fourier Transform) for the signal after the subcarrier demapping, a control information demultiplexing section 2003 which demultiplexes the data signal and control signal after the IDFT, data demodulating sections 2002 and 2007 which demodulate the demultiplexed data signal and control signal, and channel decoding sections 2001 and 2006 which perform channel decoding of the signals after the data demodulation.

The uplink ACK/NACK channel (PUCCH) receiving section 2100 has a subcarrier demapping section 2104 which demaps the signals after the channel demultiplexing, a despreading section 2103 which despreads the signals after the subcarrier demapping by the block spreading code (OCC), a cyclic shift demultiplexing section 2102 which demultiplexes the target user signal by removing the cyclic shift from the signals after the demultiplexing, and a channel selection data detection section 2101 which controls radio resource candidate information based on the mapping table.

Based on the mapping table, the channel selection data detection section 2101 reports retransmission acknowledgement signal candidate information the subcarrier demapping section 2104, the despreading section 2103 and the cyclic shift demultiplexing section 2102, and also detects the retransmission acknowledgment information of each CC.

The mapping table which the channel selection data detection section 2101 uses is common to the mapping table used on the user terminal side, and defines the combinations of retransmission acknowledgement signals in response to the downlink shared channel signals of the PCC and the SCC using a plurality of radio resources and bit information of phase modulation. The channel selection data detection section 2101 is able to determine the content of the mapping table based on the number of transport blocks determined in the transport block count determining section 2501.

The control information transmission channel selection section 2201 detects the channel that is used to transmit the retransmission acknowledgement signals, which are feedback control information, and controls switching the output between the uplink shared channel receiving section 2000 and the uplink ACK/NACK channel (PUCCH) receiving section 2100. When a retransmission acknowledgement signal is included in the PUSCH and transmitted, information that is output from the uplink shared channel receiving section 2000 is output as a retransmission acknowledgement signal. Also, when a retransmission acknowledgement signal is transmitted by the PUCCH, information that is output from the uplink ACK/NACK channel (PUCCH) receiving section 2100 is output as a retransmission acknowledgement signal.

The SRS signal receiving section 2300 has a subcarrier demapping section 2302 which demaps the SRS signal after channel demultiplexing, and an SRS received quality measurement section 2301 which measures the received quality of the SRS signal after the subcarrier demapping.

The number of processing parts and the steps of processing in the above description may be implemented with appropriate changes, without departing from the scope of the present invention. Also, the elements illustrated in the drawings show functions, and each function block may be realized by hardware or may be realized by software. Besides, the present invention can be implemented with various changes, without departing from the scope of the present invention.

The disclosure of Japanese Patent Application No. 2011-024393, filed on Feb. 7, 2011, including the specification, drawings and abstract, is incorporated herein by reference in its entirety.

The invention claimed is:

1. A user terminal comprising:
a data information demodulation section configured to demodulate downlink shared channel signals of a plurality of fundamental frequency blocks from a radio base station apparatus;
a retransmission check section configured to check retransmission and outputs a retransmission acknowledgement signal in response to the downlink shared channel signal of each of the plurality of fundamental frequency blocks;
a control information demodulation section configured to demodulate downlink control information from the radio base station apparatus and detect the number of transport blocks; and
a channel selection control section configured to, with reference to a mapping table in which combinations of retransmission acknowledgement signals for the downlink shared channel signals of the plurality of fundamental frequency blocks are defined using a plurality of radio resources and phase modulation bit information, determine radio resources to transmit the retransmission acknowledgement signals from a radio resource of an uplink control channel of a specific fundamental frequency block,
wherein the channel selection control section changes content of the mapping table according to the number of transport blocks of the specific fundamental frequency block.

2. The user terminal according to claim 1, wherein the channel selection control section changes the content of the mapping table by selecting predetermined parts from the mapping table according to the number of transport blocks.

3. The user terminal according to claim 2, wherein, when the number of transport blocks of the specific fundamental frequency block decreases, the channel selection control section changes the content of the mapping table such that the number of radio resources to set in the mapping table is reduced.

4. The user terminal according to claim 3, wherein the channel selection control section designates the radio resource of the uplink control channel of the specific fundamental frequency block that is designated using the downlink shared channel of each fundamental frequency block, as a radio resource to use in the mapping table.

5. The user terminal according to claim 4, wherein the channel selection control section designates a radio resource that is designated using a CCE index of the downlink shared channel of the specific fundamental frequency block, as at least one of a plurality of radio resources to use in the mapping table.

6. The user terminal according to claim 5, wherein the channel selection control section designates a radio resource that is designated in an ARI field provided in the downlink shared channel of a fundamental frequency block apart from the specific fundamental frequency block, as at least one of a plurality of radio resources of the mapping table.

7. The user terminal according to claim 6, wherein, when the plurality of fundamental frequency blocks are formed with a PCC (Primary Component Carrier) and an SCC (Secondly Component Carrier) and the number of transport blocks of the PCC is one, the channel selection control section applies a mapping table, content of which is predetermined parts selected from a mapping table that is applied when the number of transport blocks of the PCC is two.

8. The user terminal according to claim 7, wherein the content of the mapping table is changed by reducing one radio resource from the mapping table that is applied when the number of transport blocks of the PCC is two.

9. The user terminal according to claim 8, wherein the channel selection control section changes the content of the mapping table such that the mapping table after the change supports a format 1a or a format 1b, when the SCC is DTX.

10. A radio base station apparatus comprising:
a data information generating section configured to generate a downlink shared channel signal for each of a plurality of fundamental frequency blocks;
a transport block count determining section configured to determine a number of transport blocks to apply to transmission with a user terminal; and
a channel selection data detection section configured to, with reference to a mapping table in which combinations of retransmission acknowledgement signals for the downlink shared channel signals of the plurality of fundamental frequency blocks are defined using a plurality of radio resources and phase modulation bit information, detect a retransmission acknowledgement signal reported from the user terminal,
the channel selection data detection section specifies content of the mapping table based on the number of transport blocks determined in the transport block count determining section.

11. A radio communication method of performing radio communication in a system band that is formed with a plurality of fundamental frequency blocks, the method comprising, in a user terminal, the steps of:
demodulating downlink shared channel signals of a plurality of fundamental frequency blocks from a radio base station apparatus;
acknowledging retransmission and outputting a retransmission acknowledgement signal in response to the downlink shared channel signal of each of the plurality of fundamental frequency blocks;
demodulating downlink control information from the radio base station apparatus and detecting the number of transport blocks; and
with reference to a mapping table in which combinations of retransmission acknowledgement signals for the downlink shared channel signals of the plurality of fundamental frequency blocks are defined using a plurality of radio resources and phase modulation bit information, determining radio resources to transmit the retransmission acknowledgement signals from a radio resource of an uplink control channel of a specific fundamental frequency block,
wherein the user terminal changes content of the mapping table according to the number of transport blocks of the specific fundamental frequency block.

12. The radio communication method according to claim 11, wherein the user terminal changes the content of the mapping table by selecting predetermined parts from the mapping table according to the number of transport blocks.

13. The radio communication method according to claim 12, wherein, when the number of transport blocks of the specific fundamental frequency block decreases, the user terminal changes the content of the mapping table such that the number of radio resources to set in the mapping table is reduced.

14. The radio communication method according to claim 13, wherein, when the plurality of fundamental frequency blocks are formed with a PCC (Primary Component Carrier) and an SCC (Secondly Component Carrier) and the number of transport blocks of the PCC is one, the user terminal applies a mapping table, content of which is predetermined parts selected from a mapping table that is applied when the number of transport blocks of the PCC is two.

15. The radio communication method according to claim 14, wherein the content of the mapping table is changed by reducing one radio resource from the mapping table that is applied when the number of transport blocks of the PCC is two.

16. The radio communication method according to claim 15, wherein the channel selection control section changes the content of the mapping table such that the mapping table after the change supports a format 1a or a format 1b, when the SCC is DTX.

17. A radio communication method of performing radio communication in a system band that is formed with a plurality of fundamental frequency blocks, the method comprising, in a radio base station apparatus, the steps of:
generating a downlink shared channel signal for each of a plurality of fundamental frequency blocks;
determining the number of transport blocks to apply to transmission with a user terminal; and
with reference to a mapping table in which combinations of retransmission acknowledgement signals for the downlink shared channel signals of the plurality of fundamental frequency blocks are defined using a plurality of radio resources and phase modulation bit information, detecting a retransmission acknowledgement signal reported from the user terminal,
the radio base station apparatus specifies content of the mapping table based on the number of transport blocks.

* * * * *